(12) United States Patent
Chesnokov (10) Patent No.: US 8,160,387 B2
(45) Date of Patent: Apr. 17, 2012

(54) IMAGE PROCESSING METHOD AND COMPUTER SOFTWARE FOR IMAGE PROCESSING

(75) Inventor: Vyacheslav Chesnokov, London (GB)

(73) Assignee: Apical Limited, London (GB)

( * ) Notice: Subject to any disclaimer, the term of this patent is extended or adjusted under 35 U.S.C. 154(b) by 975 days.

(21) Appl. No.: 11/660,485

(22) PCT Filed: Aug. 19, 2005

(86) PCT No.: PCT/GB2005/003261
§ 371 (c)(1),
(2), (4) Date: Mar. 11, 2008

(87) PCT Pub. No.: WO2006/018658
PCT Pub. Date: Feb. 23, 2006

(65) Prior Publication Data
US 2008/0253681 A1  Oct. 16, 2008

(30) Foreign Application Priority Data
Aug. 20, 2004 (GB) .................................. 0418674.8

(51) Int. Cl.
*G06K 9/36* (2006.01)
(52) U.S. Cl. ..................................................... 382/276
(58) Field of Classification Search .................. 345/617; 348/28, 353, 365, 603, 673, 678, 686, E5.119; 382/205, 274, 276, 308
See application file for complete search history.

(56) References Cited

U.S. PATENT DOCUMENTS

| 4,754,332 | A | 6/1988 | Bergquist | 348/576 |
|---|---|---|---|---|
| 6,633,684 | B1* | 10/2003 | James | 382/274 |
| 6,650,774 | B1 | 11/2003 | Szeliski | 382/169 |
| 6,760,484 | B1 | 7/2004 | Sobol | |
| 6,771,814 | B1 | 8/2004 | Nakajima | |
| 2002/0154832 | A1* | 10/2002 | Sobol | 382/274 |
| 2003/0035591 | A1* | 2/2003 | Crabtree | 382/254 |
| 2003/0068097 | A1* | 4/2003 | Wilson et al. | 382/276 |
| 2005/0128496 | A1* | 6/2005 | Bala | 358/1.9 |

FOREIGN PATENT DOCUMENTS

| EP | 0 888 007 A1 | 3/1997 |
|---|---|---|
| GB | 2 061 660 A | 10/1979 |
| JP | 7170428 A | 7/1995 |
| JP | 2001113754 A2 | 4/2001 |
| JP | 2001245154 A2 | 9/2001 |

OTHER PUBLICATIONS

K Chiu, M Herf, P Shirley, S Swamy, C Wang, K Zimmerman; Spatially Nonuniform Scaling Functions for High Contrast Images; Spatially Nonuniform Scaling Functions for High Contrast Images.*

* cited by examiner

*Primary Examiner* — Gregory F Cunningham
(74) *Attorney, Agent, or Firm* — BainwoodHuang (57) ABSTRACT

The invention provides a method of image correction processing which comprises altering area image intensity values of an image according to an dynamic range compression image transform. The output image intensity of an area is altered, compared to the input image intensity, according to an area amplification coefficient. The amplification coefficient of an area is varied in dependence upon the amplification coefficient of at least one other neighbouring area. The invention preserves contrast in images that have been processed in order to compress dynamic range.

25 Claims, 12 Drawing Sheets

$$O_{ij} = \max\{I_{ij}, I_{ij-1}, I_{i-1j}, I_{ij+1}, I_{i+1j}\}$$

(a)

| $I_{i-1j-1}$ | $I_{ij-1}$ | $I_{i+1j-1}$ |
| --- | --- | --- |
| $I_{i-1j}$ | $I_{ij}$ | $I_{i+1j}$ |
| $I_{i-1j+1}$ | $I_{ij+1}$ | $I_{i+1j+1}$ |

(b)

| 0 | 1 | 0 |
| --- | --- | --- |
| 1 | 1 | 1 |
| 0 | 1 | 0 |

(c)

| $O_{i-1j-1}$ | $O_{ij-1}$ | $O_{i+1j-1}$ |
| --- | --- | --- |
| $O_{i-1j}$ | $O_{ij}$ | $O_{i+1j}$ |
| $O_{i-1j+1}$ | $O_{ij+1}$ | $O_{i+1j+1}$ |

IMAGE PROCESSING METHOD AND COMPUTER SOFTWARE FOR IMAGE PROCESSING

FIELD OF THE INVENTION

The invention relates generally to a method of image processing, and to computer software for image processing. The invention may be applied to both digital and analogue images, still and video images.

BACKGROUND OF THE INVENTION

There are a number of well-known techniques for the transformation of images. Among these techniques are non-linear image transforms, such as dynamic range compression image transforms. Dynamic range is the ratio of intensities of the brightest and darkest recordable parts of an image or scene. A dark area of an image (for example, a shadow) has low image intensity, while a lighter area (for example, a white cloud) has high image intensity. Electronic optical equipment, based on CCD detector arrays, can acquire image data incorporating a large dynamic range, for example in the order of 2500:1. However, this range can be lost when the image is digitized, either due to use of a lossy compression algorithm (e.g. JPEG, MPEG) or when the image is rendered on a medium having a narrow dynamic range (e.g. printed hard copy, displayed on a display device.)

Consequently, it can be desirable to compress the dynamic range of an image to give, it a more 'natural' appearance. Examples of dynamic range compression image transforms include Retinex, local histogram equalization, and gamma correction. A further example is the ORMIT algorithm, disclosed in patent application WO 02/089060, of which the contents are incorporated herein in full by reference, and which will be referred to in more detail below.

The transform processes described above may result in the reduction of local contrast. Local contrast may be defined as a ratio of intensities of neighbouring pixels of an image (or otherwise resolvable areas in the case of continuous image):

$$LC \equiv \frac{|I_1 - I_2|}{I_1 + I_2} \quad (1)$$

where $I_1$ and $I_2$ are intensities in two neighbouring pixels.

Figure 1:
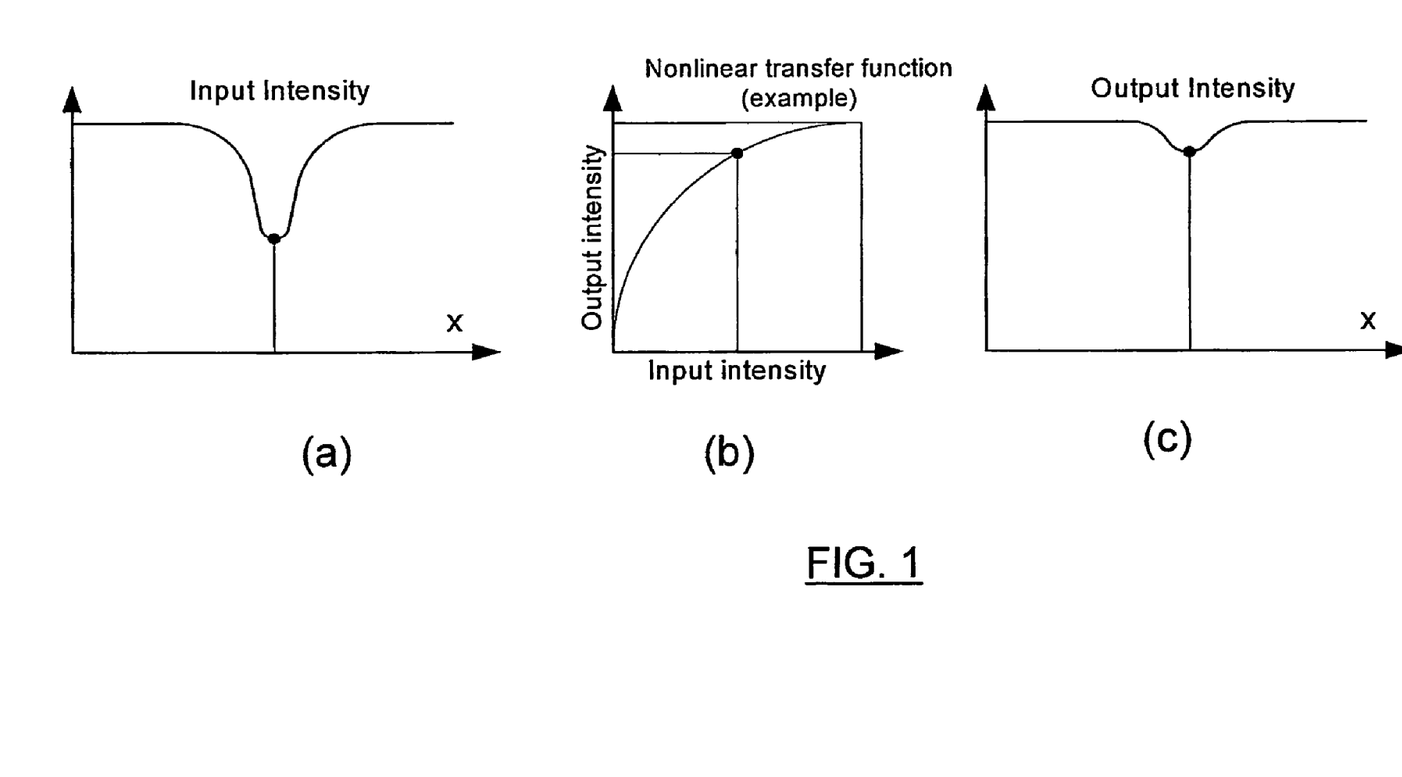
FIG. 1 is an illustration of effects of a dynamic range compression image transform, applied to a continuous image, in accordance with the prior art.

As an image is transformed using a non-linear image transform, the difference in image intensity between neighbouring pixels may be lost. FIG. 1 shows an example of a dynamic range compression image transform decreasing the local contrast. The example transform is the standard image conditioning technique known as "gamma-correction", in which a transfer curve such as that shown in part (b) is applied to vary the input intensity (a) to produce an output intensity (c) in the image. As a result of this transform, small details in bright parts of the image become less distinguishable. This can be seen in the loss of definition in the dip in the intensity curves shown in a) the input image and c) the output image.

Figure 2:
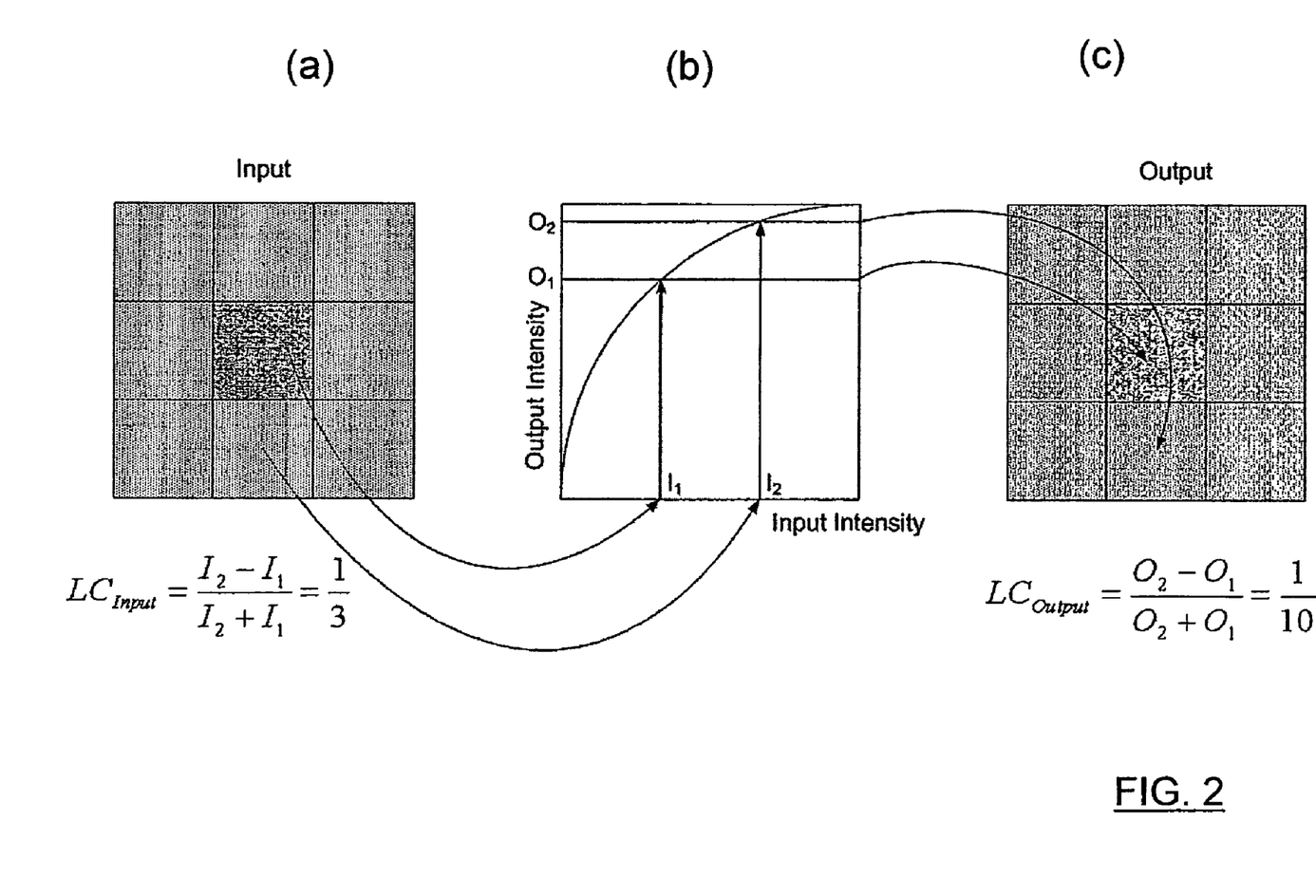
FIG. 2 is an illustration of effects of a dynamic range compression image transform, applied to a 3×3 pixel image, in accordance with the prior art.

A similar effect is illustrated in FIG. 2, in the case of a 3×3 pixel image. As can be seen, the local contrast between a relatively dark pixel and a set of relatively light pixels around it is reduced, in this example, from ⅓ to ​¹/₁₀, between the input image and the output image.

Figure 3:
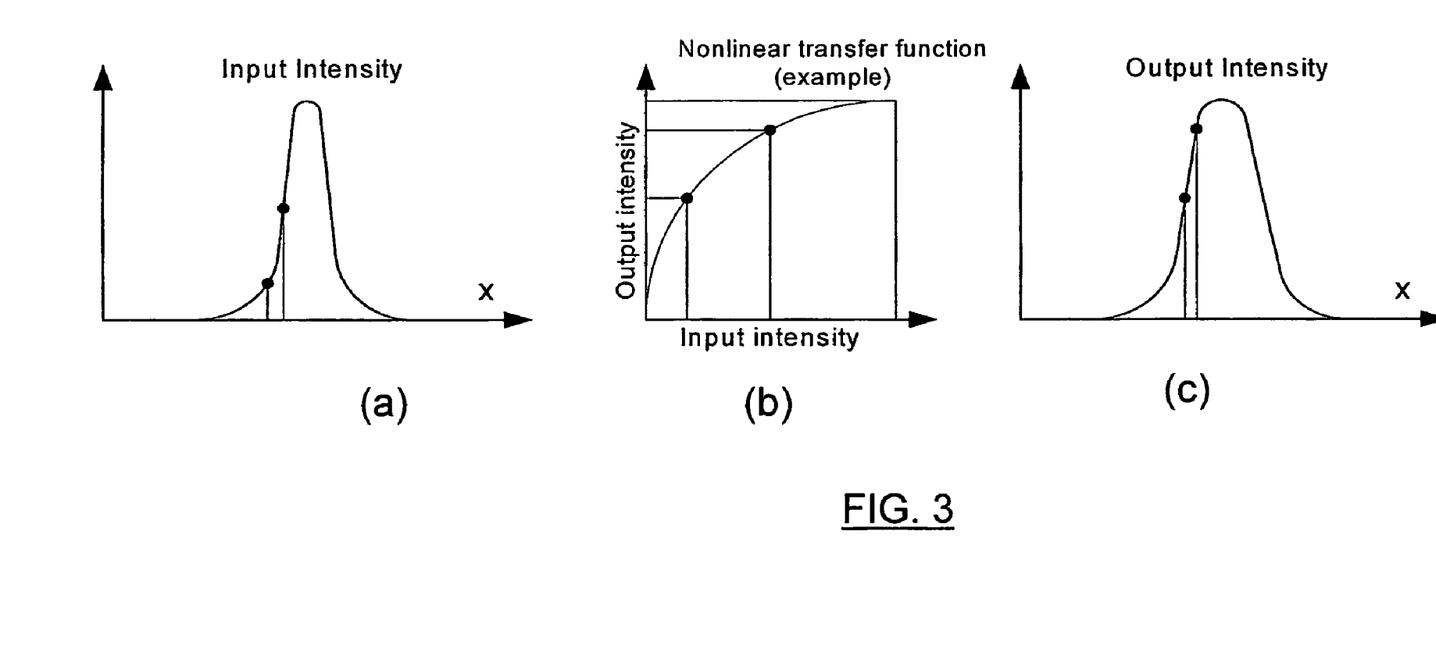
FIG. 3 is a further illustration of effects of the non-linear transform illustrated in FIG. 1.

Another kind of distortion caused by tonal mapping procedures (aiming to increase the brightness of the dark parts of a scene) such as gamma-correction may be termed "shape distortion". FIG. 3 shows an example of the shape distortion resulting from the exemplary tonal mapping. Namely, bright features can appear to increase in width. This can be seen in the increased width at the half maximum intensity of the intensity peak seen in a) the input image and c) the output image.

Local contrast in an image can be increased using known image processing techniques such as image sharpening transforms. However, if an image processed with a dynamic range compression image transform is subsequently processed using an image sharpening transform, there is little correspondence between the loss of local contrast in the initial transform and the increase of local contrast using the image sharpening transform. Hence, the resulting image tends to look less natural.

In accordance with one aspect of the present invention, there is provided a method of image processing comprising altering an input image using a non-linear image transform to generate an output image, the process comprising transforming an image on an area-by-area basis to generate an output image intensity ($O_{ij}$) of an area which is different to an input image intensity ($I_{ij}$) of the area, the output image intensity ($O_{ij}$) of an area being related to the input image intensity ($I_{ij}$) of the area by the ratio:

$$\text{amplification coefficient} = O_{ij}/I_{ij} \quad (2)$$

wherein the image processing method produces an output image in which the amplification coefficient of a given area is varied in dependence upon the amplification coefficient of at least one neighbouring area, in order that that, in at least part of the image, the local contrast of the input image is at least partially preserved in the output image.

The present invention provides a method that at least partially preserves, that is to say reduces the deterioration of, local contrast in images being processed using a non-linear image transform.

Preferably, as a result of local contrast preservation during the image transform, the local contrast in at least some parts of the output image and the local contrast of the corresponding parts of the input image are not significantly different:

$$I_1/I_2 \approx O_1/O_2$$

where $I_1$ and $I_2$ are image intensities of two immediately neighbouring areas in a relevant part of the input image, and $O_1$ and $O_2$ are the image intensities of the same two areas of the output image.

The invention provides a method in which the local contrast is at least partially preserved in at least part of an image. By parts, we mean regions having large numbers of image areas, e.g. pixels, having different intensity values. Such regions may, for example, include hundreds of pixels. Since loss of local contrast is more visible in relatively light parts of an image, local contrast is preferably preserved in at least those parts of an image in which the average input intensity is relatively light. With parts of an image where the average input intensity is relatively dark, it may be acceptable to allow significant loss of contrast, since the contrast will not in any case be discernable to the viewer, and hence the natural look of an image can still be preserved. Hence, the invention includes local contrast preservation methods in which local contrast is preserved more in relatively light parts of an image relative to relatively dark parts of an image.

According to a further aspect of the present invention there is provided a method of image processing comprising altering an input image using a non-linear image transform to generate an output image, the transform being arranged to correct an image on an area-by-area basis to generate an output image (O) of an area which is different to an input image (I), the output image omage (O) being related to the input image (I) of the area by the transform:

$$O=f(I) \qquad (5)$$

the transform generating an output image intensity ($O_{ij}$) of an area which is different to an input image intensity ($I_{ij}$) of the area, the output image intensity ($O_{ij}$) of an area being related to the input image intensity ($I_{ij}$) of the area by the ratio:

$$\text{amplification coefficient} = O_{ij}/I_{ij}$$

wherein the method comprises varying the amplification coefficient of a given area in dependence upon the amplification coefficient of at least one neighbouring area, in order that that, in at least part of the image, the local contrast of the output image is not significantly different to the local contrast of the input image:

$$I_1/I_2 \approx O_1/O_2$$

where $I_1$ and $I_2$ are image intensities of two immediately neighbouring areas of the input image, and $O_1$ and $O_2$ are the image intensities of the same two areas of the output image.

Embodiments of the present invention may be implemented in digital or analogue formats. Where the image to be processed is digital, the areas are represented by pixels. Where the image to be processed is in analogue format, the areas should be taken to be small areas of the image of a preset size, i.e. pixel-like areas.

The method of the invention may be implemented in computer software or in hardware. An exemplary implementation may take the form of a monolithic analogue integrated circuit (IC), which has the advantages of small size and low power consumption, which are desirable features in image capture devices. In image capture devices such as handheld video cameras and security cameras, small size and low power consumption are particularly desirable.

The image capture device may capture an image as an analogue image. Images captured in an analogue format may be converted to a digital format by an analogue-digital converter (ADC.) Methods in accordance with the invention may be applied either before such digitization or after such digitization.

Methods in accordance with the invention may be applied to both colour and greyscale images. In the case of colour images, the method could be used to modify the image intensity of the image, leaving hue and saturation unchanged, or the method could be used to modify individual colour channels, providing colour correction.

Embodiments of the invention may be implemented in any system in which a non-linear image transform such as dynamic range compression is employed. As such, possible implementations of the present invention include software for digital still images (stand-alone, scanner software, printer software) and video improvement; digital still and video cameras; cathode ray tube (CRT) displays; liquid crystal device (LCD) displays; image projectors; other types of display apparatus; and printers. Implementations in the analogue domain include analogue video cameras; super-fast video cameras; high quality digital video cameras; security cameras; X-ray and night-vision enhancement equipment.

The invention may be used in various image processing methods, including hazy scene enhancement; multiple exposure based image synthesis for large dynamic range scenes; advanced colour correction procedures; and universal image improvement for televisions, computer monitors, and other displays.

Further features and advantages of the invention will become apparent from the following description of preferred embodiments of the invention, given by way of example only, which is made with reference to the accompanying drawings.

DETAILED DESCRIPTION OF THE INVENTION

The present invention provides a method, referred to herein as "local contrast preservation" which is capable of improving the result of any spatially uniform (O=f(I)) or spatially varying (O=f(I,i,j) where i, j are x and y spatial coordinates of a pixel) image transform. The method of the invention can improve the local contrast of an image (as well as reducing deformation of the shape of sharp details) which is result of prior art non-linear image transforms.

Local contrast is preserved by an image processing procedure if the local contrast of the output image is, at least for most of the image, not significantly different from the local contrast of the input image:

$$I_1/I_2 \approx O_1/O_2 \qquad (3)$$

where $I_1$ and $I_2$ are image intensities of two immediately neighbouring pixels of the input image, $O_1$ and $O_2$ are the image in intensities of the same two pixels of the output image. If local contrast is significantly lower, this would mean that details within the image are less distinguishable. By "not significantly different", it is meant that the ratio of output local contrast to input local contrast is controlled so as to be near to 1, for example no more than 1½ and no less than ½. The closeness of the ratio to 1 can be varied and controlled by the specific choice of filter. This is described below.

Image transformation using a local contrast preservation method in combination with a non-linear image transform f(I) in accordance with embodiments of the present invention can be represented by a general step-by-step scheme as follows:

$$I \to I_d \to f(I_d) \to A_d \to A_{db} \to O \quad (4)$$

where $I_d$ is a filtered image intensity generated by non-linear spatial filtering (for example, dilation) of the input intensity I;

$f(I_d)$ is a transformed image intensity generated by the dynamic range compression image transform applied to the filtered image intensity $I_d$;

$A_d$ (A being a two-dimensional matrix of amplification coefficients corresponding to each area of the image being transformed, which is referred to herein as an "amplification map") is an initial amplification map generated by division of the transformed image intensity $f(I_d)$ by the filtered image intensity $I_d$:

$$A_d = f(I_d)/I_d \quad (5)$$

Figure 5:
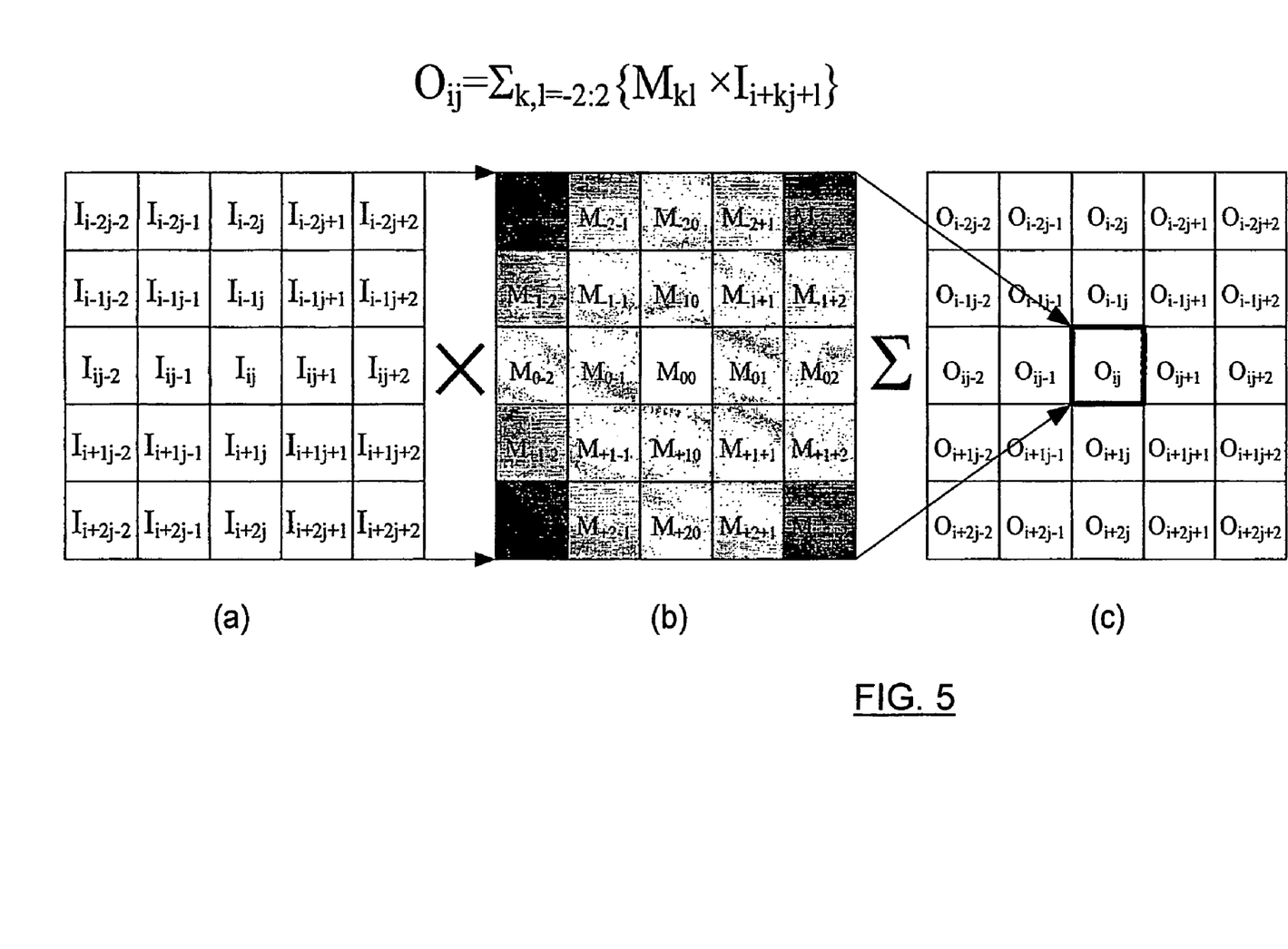
FIG. 5 is a set of (a) input image, (b) mask and (c) output image used as an example of an image blurring procedure used in an embodiment of the invention.

$A_{db}$ is a result of a "blurring" procedure ("blurring" can be generally defined as a low-pass filtering procedure reducing high frequency (spatial) components of images). An example of a blurring procedure is the Gaussian blurring procedure represented in FIG. 5.

Next, the output image intensity O is generated by applying the blurred amplification map to the original input image, by multiplying the input intensities by the corresponding amplification coefficients in the blurred amplification map.

Blurring of the amplification map before the amplification map is applied to the original image will tend to preserve local contrast in the output image. Let us demonstrate this: if we presume that the amplification map $A_{db}$, is smooth in the spatial domain, we can see that the local contrast, which defined here using equation (1) above:

$$LC \equiv \frac{|I_1 - I_2|}{I_1 + I_2} = \frac{\Delta I}{2I} \quad (6)$$

Take the case where image intensity changes very quickly between two neighbouring pixels, such that $I_1 \gg I_2$:

$$\delta I = I_1 - I_2 \sim I_1 \quad (7)$$

Even though the image intensity is varying quickly, the blurred amplification map, which is a result of low-pass filtering, changes slowly between neighbouring pixels:

$$\delta A = |A_1 - A_2| \ll A_1, A_2 \sim A \quad (8)$$

Therefore, local contrast varies between the input image and the output image:

$$\begin{aligned}
LC_0 &\equiv \frac{|A_1 I_1 - A_2 I_2|}{A_1 I_1 + A_2 I_2} \\
&\approx \frac{|A_1 I_1 - A_1 I_2| + \delta A \cdot I_2}{A_1 I_1 + A_1 I_2 + \delta A \cdot I_2} \\
&\approx \frac{|I_1 - I_2| + \frac{\delta A}{A} I_2}{I_1 + I_2 + \frac{\delta A}{A} I_2} \\
&\approx LC_I + \frac{\delta A}{A}
\end{aligned} \quad (9)$$

where $LC_O$ is the output local contrast and $LC_I$ is the input local contrast.

Therefore, $LC_O \sim LC_I$, in other words output local contrast and input local contrast are approximately equal, despite the application of a dynamic range compression image transform.

Thus we have shown that a local contrast $LC_O$ of the output image can be produced which is only slightly different from the local contrast $LC_I$ of the input image. On the other hand, contrast between areas which are remote from each other can be altered as desired by the non-linear image transform, without being affected by the local contrast preservation method. The reason is that the image processing method produces an output image in which the amplification coefficient of a given area is varied in dependence upon the amplification coefficient of at least one immediately neighbouring area, so that if local contrast is high initially, the full effect of the transform can be modified specifically in the area in which local contrast is relatively high, so that that the contrast is maintained specifically in the area in which local contrast is high.

Two different embodiments of local contrast preservation as proposed: one using a dilation procedure and another with an erosion procedure, where the dilation and erosion procedures are examples of non-linear filtering which improve the local contrast preservation procedure.

Dilation is an image processing procedure producing, for a given (i,j)th pixel, an output which tends to be close to the maximal image intensity of the immediate neighbourhood of the (i,j)th pixel on the input image.

Figure 6:
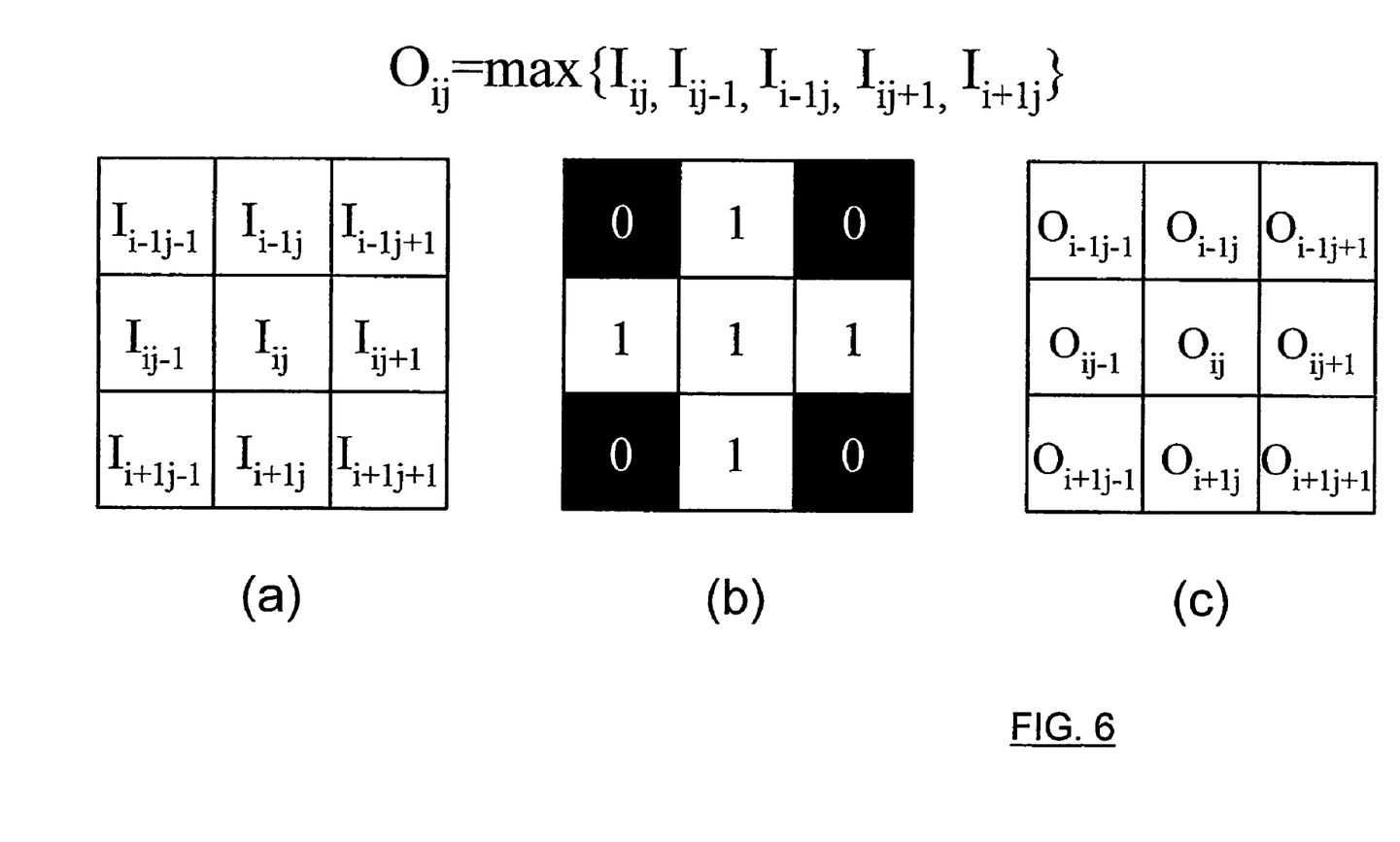
FIG. 6 is a set of (a) input image, (b) mask and (c) output image used as an example of an image dilation procedure used in an embodiment of the invention.

An example of the dilation procedure is shown in FIG. 6. The part of the input image is shown in (a), the neighbourhood is defined by the (b) and the output image is (c). The output pixel (i,j) has the image intensity of the maximal input image intensity of the neighbourhood (in this case neighbourhood includes left pixel, right pixel, and pixels above and below the current pixel) of the (i,j)th pixel. Thus, the size of relatively light areas tends to be increased.

Erosion is similar to dilation except that the output pixel (i,j) has the image intensity of the minimal input image intensity in its neighbourhood. The procedure is the inverse, in that image intensity of each pixel of output image tends to be close to the minimal (not maximal) image intensity of neighbouring pixels of the input image. Thus, the size of relatively light areas tends to be decreased.

The dilation and erosion procedures, which are known standard morphological filters, can be generalised for the case of continuous-in-space images. Various continuous implementations are envisaged. Examples of dilation include the following:

a)

$$I_d = \frac{LPF(I \cdot f(I))}{LPF(f(I))} \quad (11)$$

where $f(I)$ is a non-linear function, e.g.:

$$f(I) = \exp(\mu \cdot I) \quad (11)$$

where an appropriate setting is selected for $\mu$, e.g. $\mu = 3$;

b)

$$I_d = f^{(-1)}(LPF(f(\mu \cdot I)))/\mu \quad (12)$$

where $f(I)$ is a non-linear function, e.g.:

$$f(I) = \exp(\mu \cdot I) \quad (13)$$

and where $f^{(-1)}(I)$ is a reverse function of $f(I)$:

$$f^{(-1)}(f(I)) = I \quad (14).$$

This provides:

$$I_d = \log(LPF(\exp(\mu \cdot I)))/\mu \quad (15)$$

where an appropriate setting is selected for μ, e.g. μ=5.

The embodiment to be described below is based on the processing of a digitised image. In this case, dilation is performed such that the output pixel (i,j) has the image intensity of the maximal input image intensity of the neighbourhood of the (i,j)th pixel:

$$O_{ij} = \max_{a,b=-1,0,1} \{I_{i+a,j+b}\} \quad (16)$$

and the blurring procedure based on a sliding mask, for example a 5×5 Gaussian mask.

Figure 4:
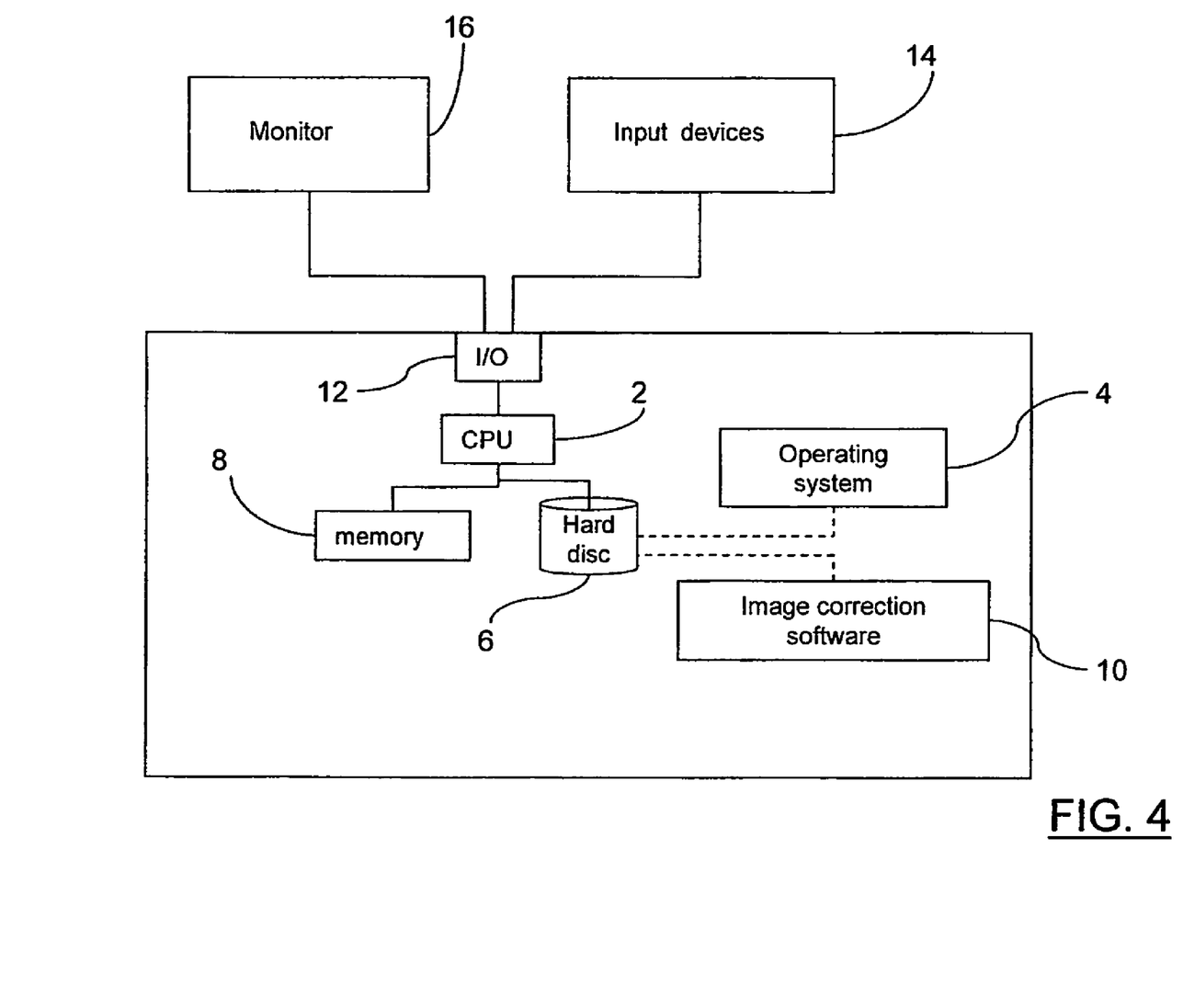
FIG. 4 illustrates a computer system arranged to perform a method according to an embodiment of the invention.

FIG. 4 illustrates a computer system arranged to perform a method according to an embodiment of the invention. The computer system comprises a central processing unit (CPU) 2, operating system software 4, a hard disc 6, memory 8, an in/out (I/O) system 12, and image correction software 10. In this embodiment, the image correction software 10 comprises a computer program, or a suite of computer programs operable to carry out a method according to the embodiment of the invention. The I/O system 12 is connected to input devices 14 and a monitor 16, which is operable to display images before and after processing by an embodiment of the present invention. Input devices may include a keyboard, a mouse, an electronic pen, or a haptic device, which may be used to select and manage images for correction according to an embodiment of the invention.

Figure 7:
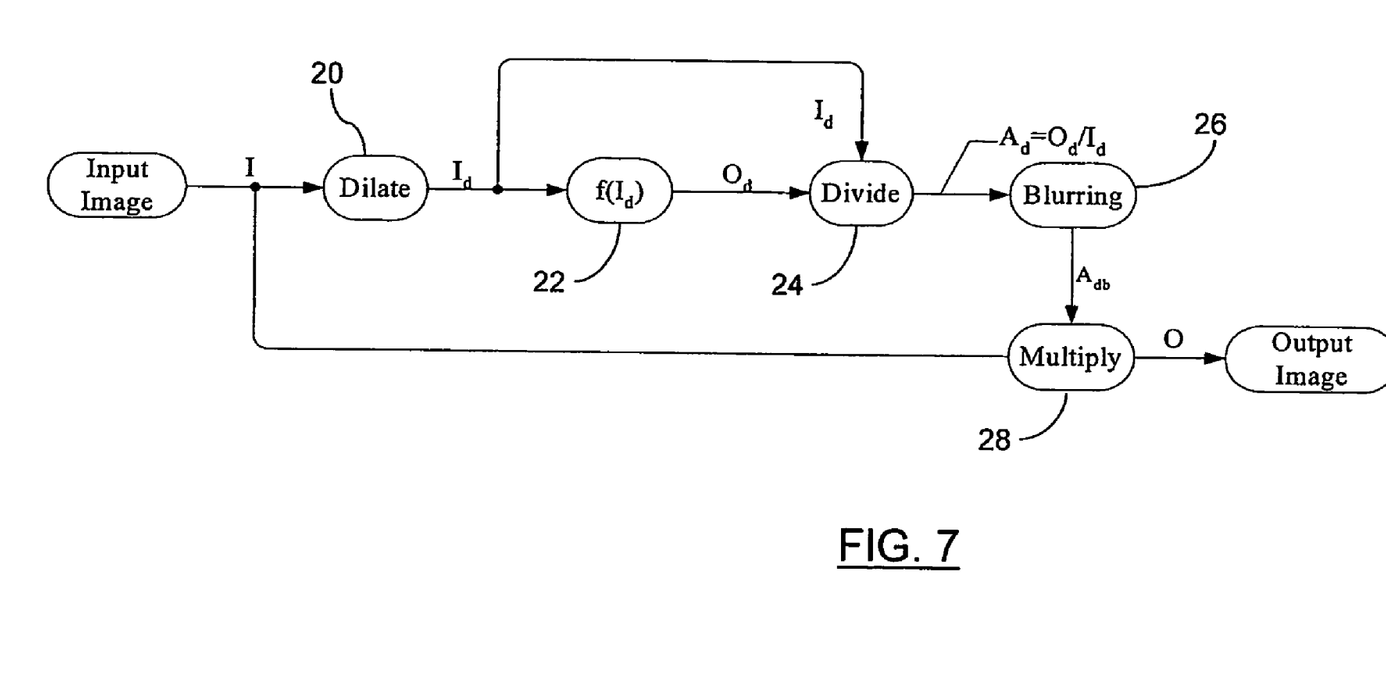
FIG. 7 is a flow diagram illustrating a method in accordance with an embodiment of the invention.
Figure 8:
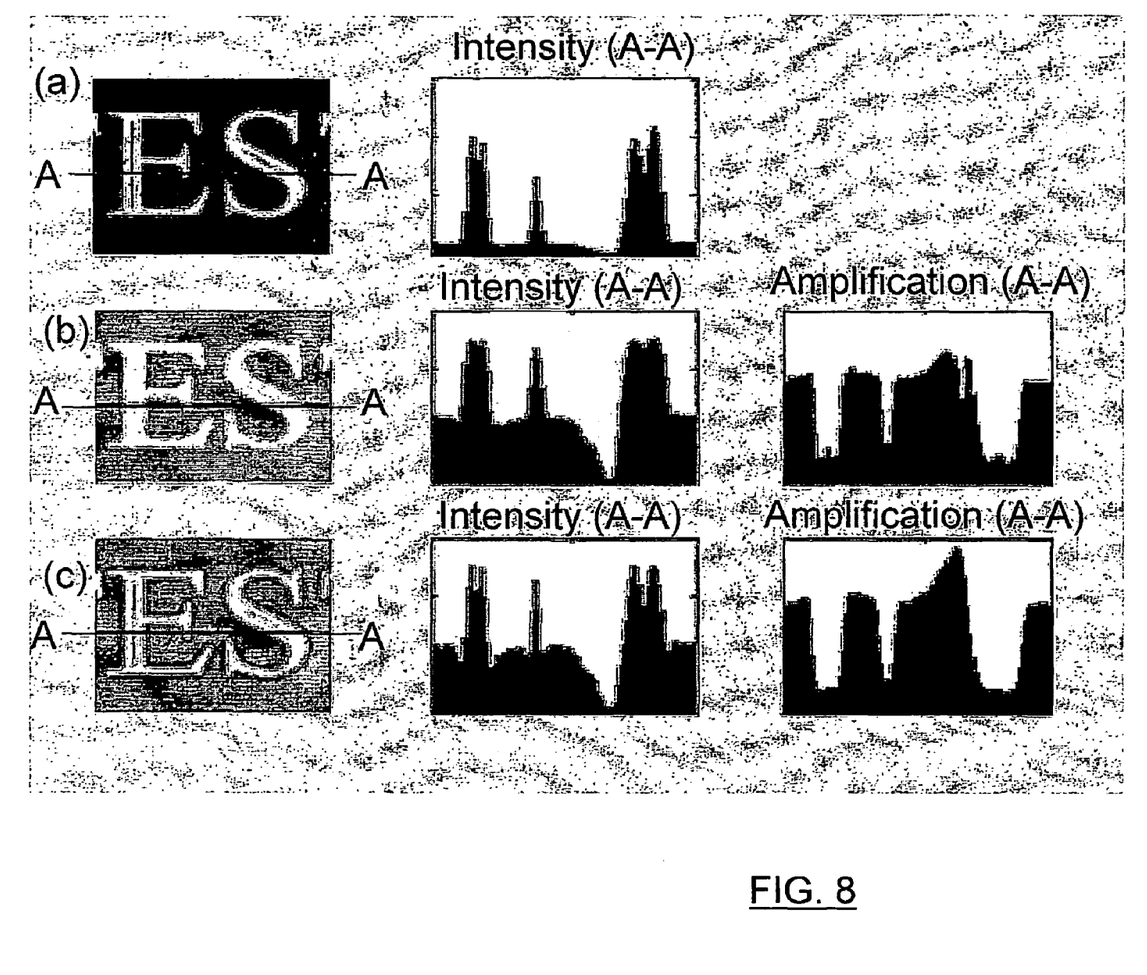
FIG. 8 shows examples of (a) an original image, (b) the transformed without using local contrast preservation, and (c) the image transformed with local contrast preservation.
Figure 9:
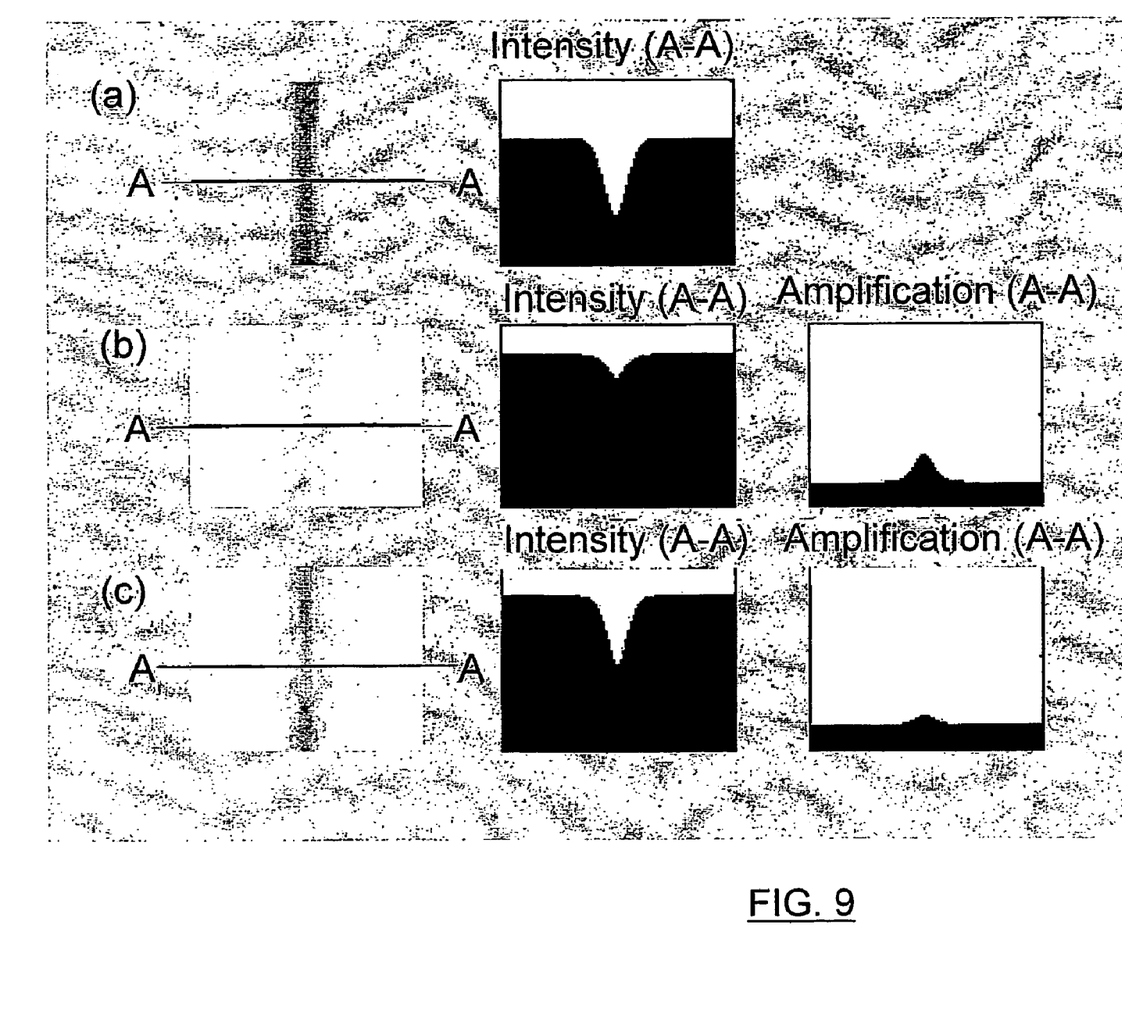
FIG. 9 shows examples of (a) an original image, (b) the transformed without using local contrast preservation, and (c) the image transformed with local contrast preservation.
Figure 10:
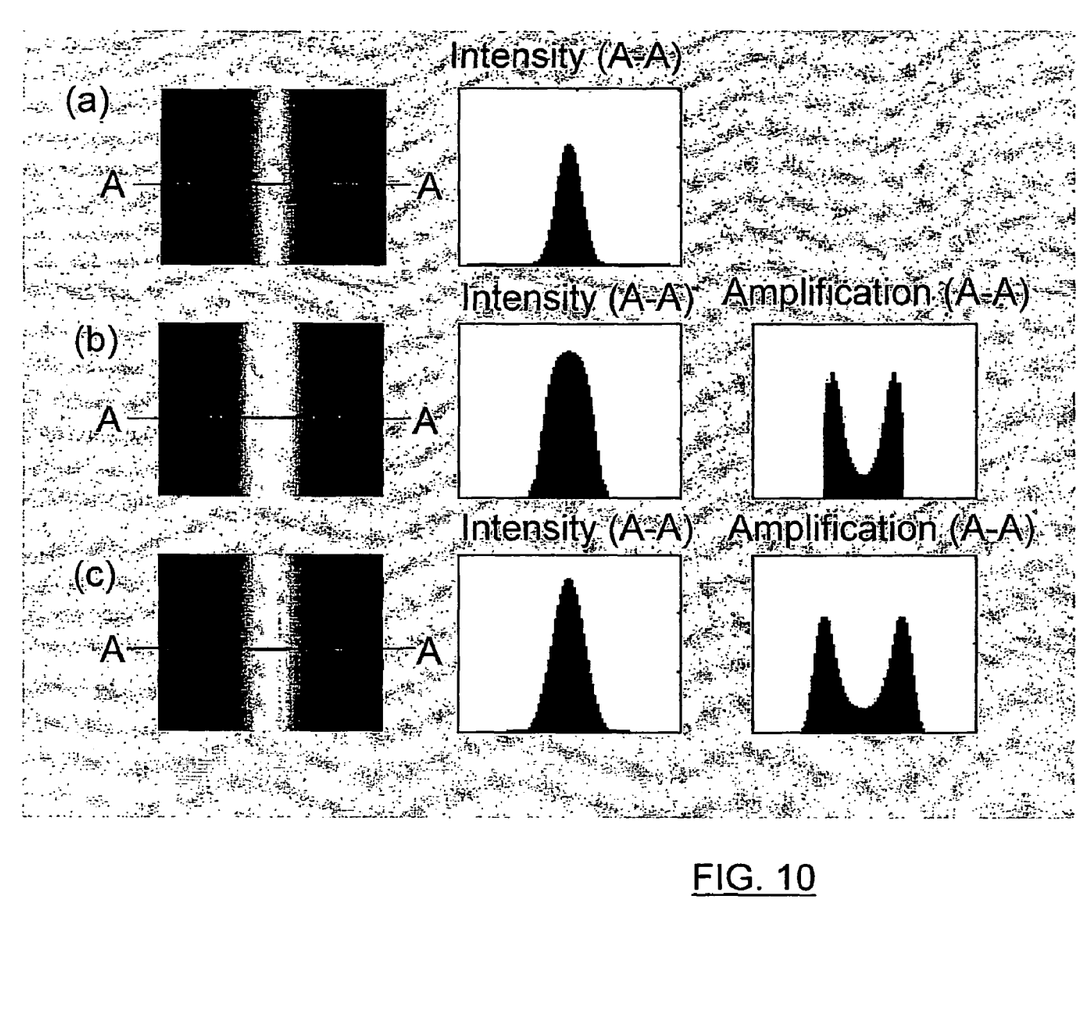
FIG. 10 shows examples of (a) an original image, (b) the transformed without using local contrast preservation, and (c) the image transformed with local contrast preservation.
Figure 11:
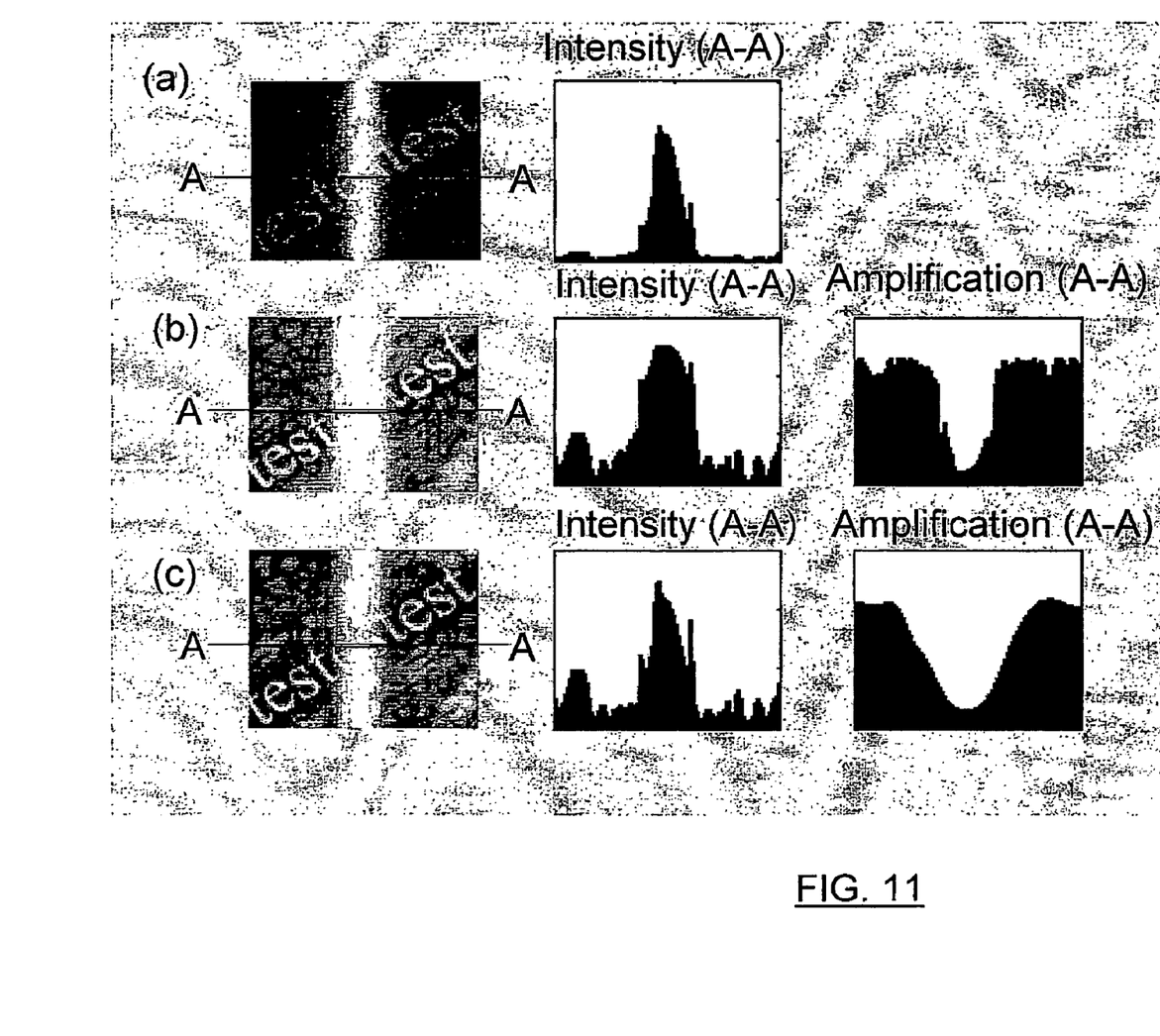
FIG. 11 shows examples of (a) an original image, (b) the transformed without using local contrast preservation, and (c) the image transformed with local contrast preservation.

FIG. 7 illustrates an embodiment of an image processing method in accordance with the invention in the form of a schematic block diagram. The input image is first analysed to determine the image intensity values of the input image before any processing of the input image takes place. The determination of the image intensity values of the input image may take a number of forms. In a black and white or grayscale image, it is a simple matter to determine image intensity; the image intensity is derived directly from the image coding or the image itself. In the case of a colour image based on a colour model such as the red-green-blue (RGB) colour model, image intensity may for example be derived by a weighted function of the input colour image intensity values $R_I, G_I, B_I$:

$$I = W_R \cdot R_I + W_G \cdot G_I + W_B \cdot B_I \quad (17)$$

where W, which may be colour-specific, is a weighting factor. In this way, a representative image intensity I is calculated for each pixel, and the transform is applied to the representative image intensity. The resulting amplification map can be applied to each of the colour image intensity values. The resulting procedure alters the output image intensity of an RGB image from input $(R_I, G_I, B_I)$ to output (Ro, Go, Bo) according to:

$$R_O = A_{db} R_I \quad (18)$$

$$G_O = A_{db} G_I \quad (19)$$

$$B_O = A_{db} B_I \quad (20)$$

Other methods of producing a representative image intensity for each colour could alternatively be used, or a separate transform procedure could be applied separately to each of the colour image intensity values.

Referring again to FIG. 7, in step 20, a dilation procedure is applied to the image intensity. The dilation function illustrated in FIG. 6 may for example be used. A dilation mask of a preset size, for example 3×3 pixels, is applied. Within the mask, which is applied to a given pixel in the centre of the mask, the image intensity of the given pixel is increased to the maximal image intensity of the highest image intensity of any pixel in the 3×3 group, and the mask is applied as a sliding mask across the entire image to create a dilated image intensity $I_d$. In this way, pixels at the edges of dark areas adjoining light areas are increased in image intensity to for light pixels—in this way the light areas are dilated in size.

From the dilated image intensity $I_d$, the non-linear image transform to be applied, $f(I)$, is applied, step 22. The tonal map correction curve of FIG. 1(b) may for example be used. Input image intensity is given on the horizontal axis, while output image intensity is on the vertical axis. The correction curve is non-linear and is formed such that dark input pixels (those of low image intensity) are corrected to a much greater degree than light input pixels (those of high image intensity). For example, a dark pixel, of low input image intensity x has a high output image intensity value z. By contrast, a light pixel of high image intensity y has an output image intensity value of y, and thus is not altered. The value of an amplification coefficient associated with a light pixel is therefore low, while the value of a coefficient associated with a dark pixel is high.

Subsequently, step 24, by dividing the output of the transform $O_d$ by the dilated image intensity $I_d$ an initial amplification map $A_d$ is derived. The amplification map $A_d$ comprises a number of amplification coefficients, each coefficient being associated with a corresponding pixel in the input image, and comprising a numerical value. The numerical value represents the degree to which the output image intensity of a pixel is altered in comparison with the input image intensity.

Next, at step 26, the values of the amplification coefficients derived at step 24 to create the amplification map $A_d$ are varied in dependence on the values of at least their closest neighbours. In this embodiment, the variation is achieved by blurring. The amplification map is blurred to derive a blurred amplification map $A_{db}$. The blurring function illustrated in FIG. 5 may for example be used. A blurring mask of a preset size, for example 5×5 pixels, is applied. Within the mask, when applied to an amplification coefficient of a given pixel in the centre of the mask, the amplification coefficient of the given pixel is changed to an average amplification coefficient of all the pixels in the 5×5 group, and the mask is applied as a sliding mask across the entire amplification map to create the blurred amplification map. In this way, amplification coefficients at the edges of high amplification areas and low amplification areas are blurred to create amplification coefficients of similar values.

The blurring process may take the form of the application of a low pass filter, which is essentially a filter that allows low frequencies to pass through, but attenuates high frequencies.

Next, the blurred amplification map $A_d$ is applied to the input image intensity I at step 28 to derive output image intensity O. Step 28 comprises applying the numerical value of each amplification coefficient to its associated pixel and altering the image intensity of each pixel according to the value, for example by multiplying the input image intensity of each pixel by the value of its associated amplification coefficient.

Note that the local contrast preservation effect of the present invention can alternatively be achieved only by blurring of an amplification map produced without initially dilating the image intensity. However, artifacts such as "haloes" can result. Consider an exemplary image which initially consists of a central block of dark pixels, surrounded by light pixels. An amplification map can be produced by applying a desired image transform (for example gamma correction) and dividing the result by the input image intensity. Next, the amplification map is blurred using a 3×3 mask to generate a blurred amplification map. Since the amplification coefficients associated with the dark pixels are relatively high, the amplification coefficients associated with the initially light pixels closest to the dark pixels are increased by the blurring process. Thus, when the blurred amplification map is applied to the input image, a 'halo' of high image intensity will appear in the output image around the dark central area.

A dilation procedure is used in order to counteract this 'halo' effect. In the dilation process, neighbouring pixels in the image are grouped together and the image intensity value of all pixels in each group is determined, and then increased to the maximum value of the pixel with the highest image intensity value. The neighbouring pixels may be grouped according to their most immediate neighbours, or according to larger groups. Dilation resets the image intensity value of a pixel to the highest image intensity value of any pixel in the group. The size of the group may be altered according to the degree of dilation required.

FIGS. 8 to 11 illustrate examples of a dynamic range compression image transform using a tonal map correction curve procedure applied to an input image, as shown in part (a), which can result in both shape distortion and loss of the local contrast, as shown in part (b), along with the improved results provided by the local contrast preservation technique described above in relation to FIG. 6, as shown in part (c).

The method of the invention may be applied to produce varying degrees of local contrast preservation. In any event, the method is used during the dynamic range compression image transform to reduce the loss of local contrast which would occur during application of the dynamic range compression image transform had the local contrast preservation method not been used. The result is that the local contrast in each part of the output image is closer to the local contrast in each part of the input image than would otherwise be the case. The degree of closeness depends upon the nature of the blurring transform applied to the amplification map. For example, in the case of the use of a Gaussian filter, $G=\exp\{-(x^2+y^2)/g^2\}$, a blurring kernel of $g=1$ will reduce the difference between input and output local contrast by around 50%, while a blurring kernel of $g=2$ will reduce the difference by around 70%.

Figure 12:
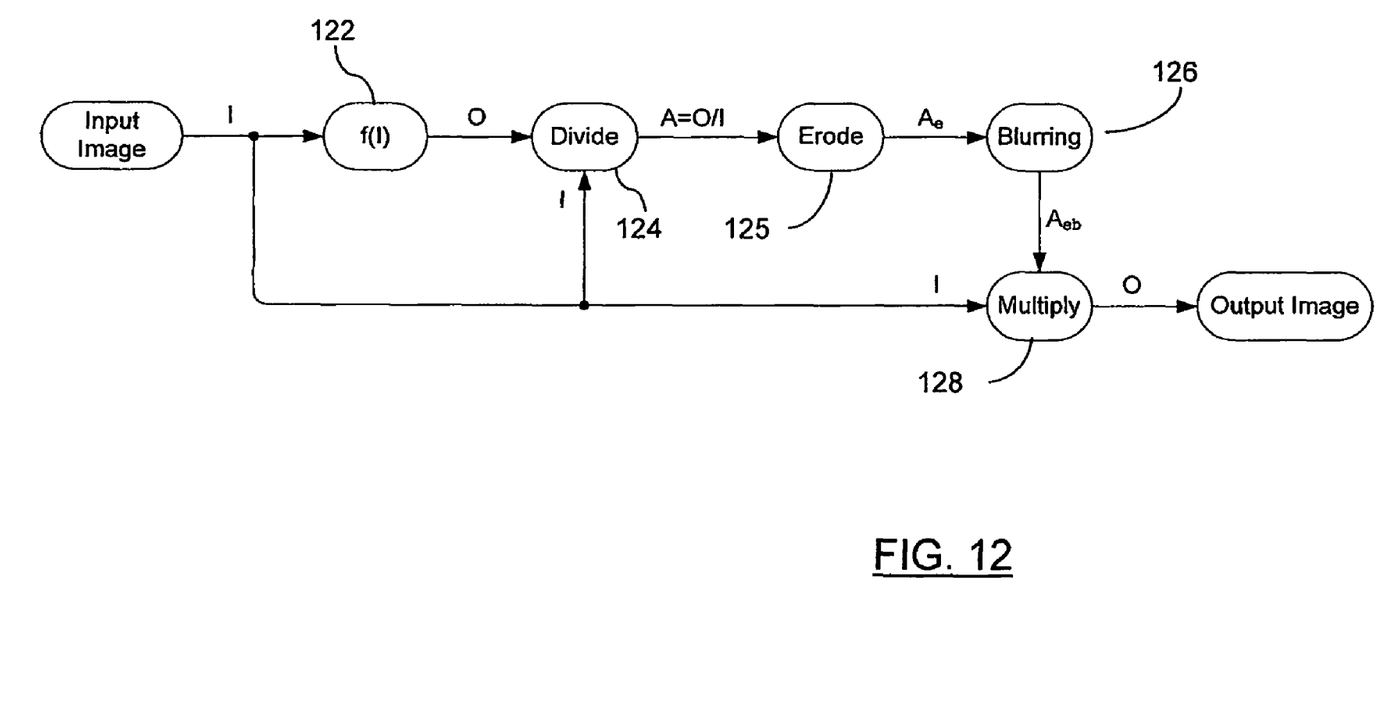
FIG. 12 shows a flow diagram illustrating a method in accordance with further embodiments of the invention.

FIG. 12 illustrates an alternative embodiment of the invention, used instead of the procedure illustrated in FIG. 7. For the sake of brevity, steps which are similar to steps described in relation to FIG. 7 are referred to with the same reference numerals, except incremented by 100, and the same description of those steps should be taken to apply here also. The procedure is modified, in that the input image intensity is not first dilated before the generation of the initial amplification map A in step 124. However, after the initial amplification map A is produced, the amplification map A is subjected to an erosion procedure, step 125, as described above, to produce an eroded amplification map $A_e$. The erosion of the amplification map tends to reduce the size of areas having high amplification coefficients and therefore also reduces the "haloing" effect described above. Next, the blurring process is applied to the eroded amplification map $A_e$, to generate a blurred eroded amplification map $A_{eb}$, step 126, which is then applied to the input image intensity I to generate the output image intensity O, step 128.

It should be understood, therefore, that either dilation of the input image or erosion of the initial amplification function, or a combination of the two, can be implemented to derive an amplification function that will not give rise to the halo effect when a local contrast preservation technique according to the present invention is applied to an image transform used applied an input image to create an output image.

In other embodiments of the invention, the tonal map correction curve transform may be replaced by a more complex image transform. Such a method may take the form of an algorithm such as that described in International patent application having International Publication Number WO 02/089060, entitled Image Enhancement Methods and Apparatus Therefor. This application describes an image enhancement algorithm known as ORMIT (orthogonal retino-morphic image transform). The ORMIT algorithm is a spatially varying dynamic range compression algorithm in that it treats different parts of an image differently depending on the image intensity of those parts. The ORMIT method comprises processing an input signal to generate an adjusted output signal, wherein an adjusted image intensity value $I_{out}(x,y)$ is calculated from the input image intensity values $I(x,y)$, for different positions in the image, by:

$$I_{out} = \sum_{i=0}^{N} \alpha_i(I) LPF_{\Omega_i}[P_i(F(I))] \cdot Q_i(F(I)) + \beta(I) \qquad (21)$$

where $P_i(\gamma)$ is an orthogonal basis of functions of $\gamma$ defined in the range $0<\gamma<1$; and $Q_i(\ldots)$ are antiderivatives of $P_i(\ldots)$:

$$Q_i(F(I)) = \int_0^{F(I)} P_i(\eta) d\eta \qquad (22)$$

or an approximation thereto; $LPF_\Omega[\ldots]$ is an operator of low-pass spatial filtering; $\Omega_i$ is a cut-off frequency of the low-pass filter, and $F(\ldots)$ is a weighting function. The overall effect of the algorithm is to compress the dynamic range of an image while preserving the 'natural look' of the image. The output image intensity is calculated according to:

$$O(I) = \sum_{n=1}^{N} Lpf(P_n(F(I))) Q_n(F(I)) \qquad (23)$$

It should be noted that the determination of the initial image intensity values of the input image may take a number of forms. In the case of colour images, the initial image intensity may be derived from the image intensity of whichever colour has the maximum value, or the initial image intensity may be derived by taking an average of the image intensity of all colours present in the pixel.

A spatially-varying local contrast preservation technique may be applied, in which the amount of local contrast preservation applied varies across different parts of an image. Such variation may be useful where the amount of small detail in an image varies across the image. In particular, an image often has different sharpness in different regions due to the image capture being conducted when a lens is focused on one object but other parts of the image are not in focus. In such cases it could be beneficial to apply spatially-varying procedure, where both dilation and blurring use mask sizes in accordance with the cut-off frequency (as determined by a predetermined cut-off threshold) of the spatial spectrum in different parts of an image. Alternatively, local contrast preservation may be applied only to a part of an image selectively, where the most detail is to be found, e.g. in a sharply focused part of an image.

As well as the combination of dilation of the input image intensity followed by blurring of the amplification map, dilation of the input image could be used alone in order to preserve local contrast. In either case the form of the dilation filter could be the maximal filter described here (as a maximum of neighbouring pixels), or a generalisation to a continuous dilation which gives approximately maximal intensity of the neighbourhood. Such a "dilation" procedure is in general a nonlinear filtering procedure, where the output intensity of a pixel (or an area) is defined by a nonlinear function of intensities of neighbouring pixels of an input image. As an example of such continuous dilation may be considered a combination of maximal filter and blurring, where the maximal filter means that the intensity of an area of output image is defined by the maximal intensity of the neighbouring areas of the input image, and blurring means that the intensity of an output image is defined as an average intensity of the neighbouring areas. The size of the neighbourhood may be defined independently for the maximal filter step and the blurring step.

Contrast between areas which are remote from each other can be described as "global contrast." Global contrast may be defined as a ratio of intensities of remote pixels of an image (or otherwise resolvable areas in the case of continuous image):

$$LC \equiv \frac{|I_{R1} - I_{R2}|}{I_{R1} + I_{R2}} \quad (24)$$

where $I_{R1}$ and $I_{R2}$ are intensities in two remote pixels. According to the invention, the local contrast is preserved to a greater extent than the global contrast. Or, put in another way, the global contrast of the image is varied in different sections of the image without destroying the local contrast values.

The above embodiments are to be understood as illustrative examples of the invention. Further embodiments of the invention are envisaged. For example, although the described embodiment describes the application of the method of the invention to a digital image made up of discrete pixels, the method can also be applied to an analogue (continuously variable) image. In the case of an analogue implementation, the image would be divided into areas for the purposes of image intensity correction processing according to the invention. Whilst the image transforms described in the embodiments above are dynamic range compression image transforms, other non-linear transforms, such as dynamic range expansion image transforms, may also be improved using the local contrast preservation method of the present invention.

Further, whilst in the above-described embodiments, the local contrast preservation procedure is applied using a series of separate processing steps each of which is applied across the entire image before the next step is carried out, it is possible that two or more of the steps could be combined into a single-step image transform algorithm applied across the image once only.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of image processing comprising correcting, by processing circuitry, an image on an area-by-area basis to generate an output image intensity (Oij) of an area which is different to an input image intensity (Iij) of the area, the output image intensity (Oij) of an area being related to the input image intensity (Iij) of the area by:

$Oij$ =amplification coefficient×$Iij$, wherein the method comprises:
generating, by the processing circuitry and using a non-linear image transform, an amplification coefficient of a given area using the input image intensity (Iij);
varying, by the processing circuitry, the amplification coefficient of the given area based on a substantially minimum amplification coefficient of a set of neighbouring areas, the set comprising the given area; and
generating, by the processing circuitry, an output image intensity (Oij) of the given area using the varied amplification coefficient, in order that, in at least part of the image, the local contrast of the input image is at least partially preserved in the output image.

2. A method according to claim 1 where the non-linear transform is a transform which alters the dynamic range of the image.

3. A method according to claim 2, wherein the transform is a dynamic range compression image transform.

4. A method according to claim 1 wherein the image processing method produces an output image in which the amplification coefficient of a given area is varied based on the amplification coefficient of a set of neighbouring areas, in order that, in at least part of the image comprising the set of neighbouring areas, the local contrast of the output image is not significantly different to the local contrast of the input image:

$I_1/I_2 \approx O_1/O_2$ where $I_1$ and $I_2$ are image intensities of two immediately neighbouring areas of the set of neighbouring areas, and $O_1$ and $O_2$ are the image intensities of the same two areas of the output image.

5. A method according to claim 1, wherein the method comprises further varying the amplification coefficients by employing a low pass filter.

6. A method according to claim 1, comprising altering the image intensity of the given area before generating the amplification coefficient for the given area.

7. A method according to claim 6, comprising altering the image intensity of the given area based on a substantially maximal image intensity of the set of neighbouring areas.

8. A method according to claim 1, comprising blurring the amplification coefficient of the given area to be substantially an average of a further set of neighbouring amplification coefficients, the further set comprising the given area.

9. A method according to claim 1, comprising storing at least the amplification coefficient of the given area and the amplification coefficient of at least one other neighbouring area in an amplification map corresponding to the image.

10. A method according to claim 9, wherein every amplification coefficient in the map is varied based on the amplification coefficient of at least one other neighbouring area in the map.

11. A method according to claim 1, wherein said image is a digital image, and each said area is a pixel.

12. A computer program product having a non-transitory computer readable storage medium which stores code to correct an image on an area-by-area basis to generate an output image intensity (Oij) of an area which is different to an input image intensity (Iij) of the area, the output image intensity (Oij) of an area being related to the input image intensity (Iij) of the area by:

$$Oij = \text{amplification coefficient} \times Iij,$$

the code including instructions to:
generate, using a non-linear image transform, an amplification coefficient of a given area using the input image intensity (Iij);
vary the amplification coefficient of given area based on a substantially minimum amplification coefficient of a set of neighbouring areas, the set comprising the given area; and
generate an output image intensity (Oij) of the given area using the varied amplification coefficient, in order that, in at least part of the image, the local contrast of the input image is at least partially preserved in the output image.

13. An apparatus configured to perform a method of image processing comprising correcting an image on an area-by-area basis to generate an output image intensity ($O_{ij}$) of an area which is different to an input image intensity ($I_{ij}$) of the area, the output image intensity ($O_{ij}$) of an area being related to the input image intensity ($I_{ij}$) of the area by:

$$Oij = \text{amplification coefficient} \times Iij$$

wherein the method comprises:
generating, using a non-linear image transform, an amplification coefficient of a given area using the input image intensity (Iij);
varying the amplification coefficient of the given area based on a substantially minimum amplification coefficient of a set of neighbouring areas, the set comprising the given area; and
generating an output image intensity (Oij) of the given area using the varied amplification coefficient, in order that, in at least part of the image, the local contrast of the input image is at least partially preserved in the output image.

14. A method of image processing comprising correcting, by processing circuitry, an image on an area-by-area basis to generate an output image intensity ($O_{ij}$) of an area which is different to an input image intensity ($I_{ij}$) of the area, the output image intensity ($O_{ij}$) of an area being related to the input image intensity ($I_{ij}$) of the area by:

$$O_{ij} = \text{amplification coefficient} \times I_{ij},$$

wherein the method comprises:
altering, by the processing circuitry, the input image intensity ($I_{ij}$) of a given area based on a substantially maximal image intensity of a set of neighbouring areas, the set comprising the given area;
generating, by the processing circuitry and using a non-linear image transform, an amplification coefficient of the given area using the altered image intensity; and
generating, by the processing circuitry, an output image intensity ($O_{ij}$) of the given area using the original input image intensity ($I_{ij}$) and the amplification coefficient of the given area, in order that, in at least part of the image, the local contrast of the input image is at least partially preserved in the output image.

15. A method according to claim 14, comprising varying the amplification coefficient of the given area based on the amplification coefficients of a further set of neighbouring areas, the further set comprising the given area.

16. A method according to claim 15, wherein the method comprises further varying the amplification coefficients by employing a low pass filter.

17. A method according to claim 14, comprising blurring the amplification coefficient of the given area to be substantially an average of a further set of neighbouring amplification coefficients, the further set comprising the given area.

18. A method according to claim 14 where the non-linear transform is a transform which alters the dynamic range of the image.

19. A method according to claim 18, wherein the transform is a dynamic range compression image transform.

20. A method according to claim 14, wherein the method comprises further varying the amplification coefficients by employing a low pass filter.

21. A method according to claim 14, comprising storing at least the amplification coefficient of the given area and the amplification coefficient of at least one other neighbouring area in an amplification map corresponding to the image.

22. A method according to claim 21, wherein every amplification coefficient in the map is varied based on the amplification coefficient of at least one other neighbouring area in the map.

23. A method according to claim 14, wherein said image is a digital image, and each said area is a pixel.

24. A computer program product having a non-transitory computer readable storage medium which stores code to correct an image on an area-by-area basis to generate an output image intensity ($O_{ij}$) of an area which is different to an input image intensity ($I_{ij}$) of the area, the output image intensity ($O_{ij}$) of an area being related to the input image intensity ($I_{ij}$) of the area by:

$$O_{ij} = \text{amplification coefficient} \times I_{ij},$$

the code including instructions to:
alter the input image intensity ($I_{ij}$) of a given area based on a substantially maximal image intensity of a set of neighbouring areas, the set comprising the given area;
generate, using a non-linear image transform, an amplification coefficient of the given area using the altered image intensity; and
generate an output image intensity ($O_{ij}$) of the given area using the original input image intensity ($I_{ij}$) and the amplification coefficient of the given area, in order that, in at least part of the image, the local contrast of the input image is at least partially preserved in the output image.

25. An apparatus configured to perform a method of image processing comprising correcting an image on an area-by-area basis to generate an output image intensity ($O_{ij}$) of an area which is different to an input image intensity ($I_{ij}$) of the area, the output image intensity ($O_{ij}$) of an area being related to the input image intensity ($I_{ij}$) of the area by:

$$O_{ij} = \text{amplification coefficient} \times I_{ij},$$

wherein the method comprises:
altering the input image intensity ($I_{ij}$) of a given area based on a substantially maximal image intensity of a set of neighbouring areas, the set comprising the given area;
using a non-linear image transform to generate an amplification coefficient of the given area using the altered image intensity; and
generating an output image intensity ($O_{ij}$) of the given area using the original input image intensity ($I_{ij}$) and the amplification coefficient of the given area, in order that that, in at least part of the image, the local contrast of the input image is at least partially preserved in the output image.

* * * * *